(12) United States Patent
Li

(10) Patent No.: US 8,856,745 B2
(45) Date of Patent: Oct. 7, 2014

(54) SYSTEM AND METHOD FOR USING A SHARED STANDARD EXPECTATION COMPUTATION LIBRARY TO IMPLEMENT COMPLIANCE TESTS WITH ANNOTATION BASED STANDARD

(75) Inventor: Haijun Li, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 59 days.

(21) Appl. No.: 13/564,590

(22) Filed: Aug. 1, 2012

(65) Prior Publication Data

US 2014/0040864 A1 Feb. 6, 2014

(51) Int. Cl.
*G06F 9/45* (2006.01)

(52) U.S. Cl.
USPC ........... 717/124; 717/126; 717/127; 717/128; 717/129

(58) Field of Classification Search
None
See application file for complete search history.

(56) References Cited

U.S. PATENT DOCUMENTS

| | | | |
|---|---|---|---|
| 6,353,925 B1 | 3/2002 | Stata et al. | |
| 7,281,237 B2 * | 10/2007 | de Jong | 717/126 |
| 7,536,679 B1 | 5/2009 | O'Connell | |
| 7,797,400 B2 | 9/2010 | Singh | |
| 7,836,346 B1 | 11/2010 | Davidov | |
| 8,495,567 B2 * | 7/2013 | Bak et al. | 717/120 |
| 2002/0198868 A1 | 12/2002 | Kinzhalin | |
| 2004/0143814 A1 * | 7/2004 | de Jong | 717/104 |
| 2004/0199818 A1 | 10/2004 | Boilen | |
| 2006/0294502 A1 * | 12/2006 | Das et al. | 717/129 |
| 2007/0067388 A1 | 3/2007 | Angelov | |
| 2008/0270974 A1 | 10/2008 | Topchiyski | |
| 2008/0270992 A1 | 10/2008 | Georgieva | |
| 2012/0047489 A1 * | 2/2012 | Varadharajan | 717/124 |
| 2012/0159446 A1 * | 6/2012 | Jentsch et al. | 717/124 |
| 2012/0254830 A1 * | 10/2012 | Conrad et al. | 717/106 |
| 2013/0339930 A1 * | 12/2013 | Xu | 717/125 |

FOREIGN PATENT DOCUMENTS

WO 2010127582 11/2010

OTHER PUBLICATIONS

Anonymous, "A method and mechanism of unit testing using structured annotations in programming language". An IP.com Prior Art Database Technical Disclosure, Ip.com Electronic Publication—Apr. 27, 2012. 4 pages.

"Writing Junit Tests in NetBeans IDE". 25 pages. Retrieved Feb. 27, 2014 from: https://netbeans.org/kb/docs/java/junit-intro.html.

Oracle, Programming Web Services for WebLogic Server, Ant Task Reference, 2008, 51 pages.

* cited by examiner

*Primary Examiner* — Isaac T Tecklu
(74) *Attorney, Agent, or Firm* — Meyer IP Law Group

(57) ABSTRACT

A system and method can implement compliance tests with annotation based standards using a model library. The model library encapsulates expectation computation logic described in one or more annotation based assertions. A compliance test can obtain an actual value for one or more software properties based on evaluating a source file that contains one or more annotations that is defined by the one or more annotation based assertions, and can determine an expected value for the one or more software properties using the model library. Then, the compliance test can compare the actual value for the one or more software properties with the expected value for the one or more software properties.

20 Claims, 3 Drawing Sheets

SYSTEM AND METHOD FOR USING A SHARED STANDARD EXPECTATION COMPUTATION LIBRARY TO IMPLEMENT COMPLIANCE TESTS WITH ANNOTATION BASED STANDARD

CROSS-REFERENCED APPLICATIONS

The current application hereby incorporates by reference the material in the following patent application:

U.S. patent application Ser. No. 13/564,602, entitled "SYSTEM AND METHOD FOR USING AN ABSTRACT SYNTAX TREE TO ENCAPSULATE THE DESCRIPTIVE ASSERTIONS IN AN ANNOTATION BASED STANDARD INTO A CODE BASED LIBRARY," filed Aug. 1, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to implementing a compliance test.

BACKGROUND

Annotations, which refer to the metadata in the source code for attaching extra information, are widely used in JAVA Enterprise Edition (JEE). Many standard annotations have been defined in different JEE standards, most of which contains annotation based assertions. Some J2EE standards can even be pure annotation based standards, such as JSR181 and JSR250.

These are the generally areas that embodiments of the invention are intended to address.

SUMMARY

Described herein are systems and methods for implementing compliance tests with annotation based standards using a model library. The model library encapsulates expectation computation logic described in one or more annotation based assertions. A compliance test can obtain an actual value for one or more software properties based on evaluating a source file that contains one or more annotations that is defined by the one or more annotation based assertions, and can determine an expected value for the one or more software properties using the model library. Then, the compliance test can compare the actual value for the one or more software properties with the expected value for the one or more software properties.

DETAILED DESCRIPTION

Described herein is a system and method for using a shared standard expectation computation library to implement compliance tests with various annotation based standards.

A computer programming environment, such as JAVA Enterprise Edition (JEE) environment, can involve many component standards. For example, a JEE certified application server (e.g. WebLogic Server provided by Oracle) is preferably compliant with various JEE standards. The content of these different standards can include a collection of assertions, each of which is a statement declaring an expected output for a specific input. An annotation based standard contains the definition of specific annotations and declares assertions based on those annotations.

Different compliance tests can be developed by the quality assurance (QA) team to verify whether target computer software complies with these standards. Standard compliance tests can verify every assertion included in these standards. For example, a JEE Application Server may be considered compliant with an assertion when the JEE Application Server behaves the same as the expectation described in the assertion. Furthermore, the JEE Application Server is considered to be compliant with a standard when it complies with all assertions included in the standard.

In accordance with an embodiment of the invention, the language based descriptive assertions in a standard can be encapsulated into a shared expectation computation library. One or more concrete tests can depend on the shared library to get the expectations required for testing annotation based standard compliance. This shared library can be a single point of truth within a product team. This shared library can shorten the learning path of testing developers, can cut down the possibility of making mistake when interpreting assertions of annotation based standards, and can allow the compliance tests to have a loose dependency on the standard and have a better tolerance of standard updates.

Figure 1:
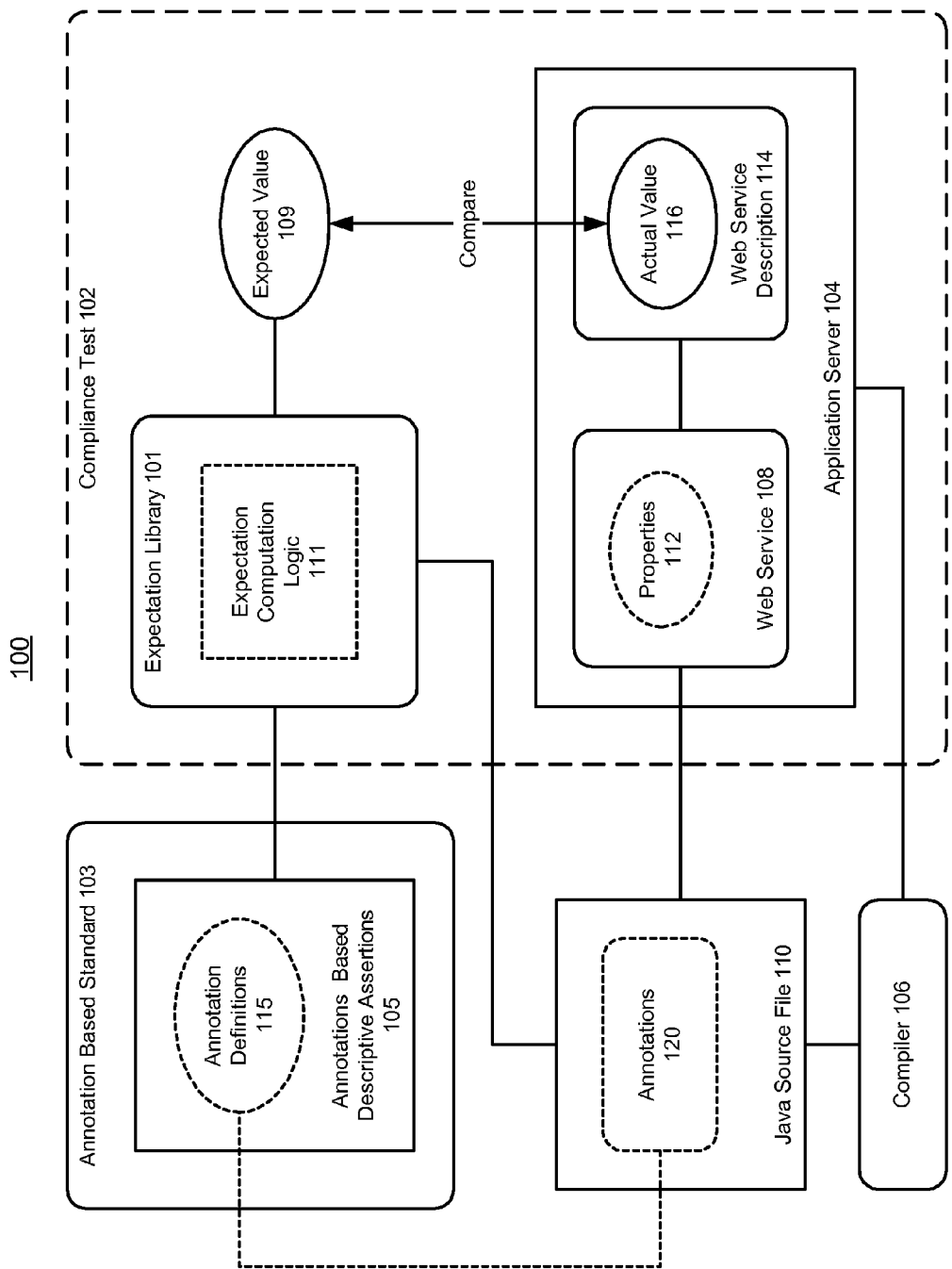
FIG. 1 shows an illustration of a testing environment that supports implementing a compliance test with an annotation based standard, in accordance with an embodiment of the invention.

FIG. 1 shows an illustration of a testing environment 100 that supports implementing a compliance test with an annotation based standard, in accordance with an embodiment of the invention. As shown in FIG. 1, the testing environment 100 can support performing a compliance test 102 with an annotation based standard 103. The compliance test 102 can evaluate a source file 110, e.g. via a compiler 106 associated with an application server 104.

The source file 110 can be in an object oriented programming language, e.g. JAVA programming language, that allows the usage of various annotations 120. The annotations 120 can be defined in an annotation based standard 103, which include annotation based descriptive assertions 105 that contain the annotation definitions 115.

Additionally, the compiler 106 can be used to compile the source file 110 into a web service 108. The description of the embodiments of the invention as following uses web service as an example for software applications, components, and services. It will be apparent to those skilled in the art that other types of software applications, components, and services, such as a web application and/or a J2EE component (e.g. an EJB bean), can be used, without limitation.

As shown in FIG. 1, the web service 108 can be deployed on the one or more applications servers 104 for accessing by different clients. Furthermore, the web service 108 can be associated or configured with one or more properties 112, which can be described in a web service description 114, e.g. a Web Services Description Language (WSDL) file. Then, a test developer can manually or programmablly parse the web service description 114 in order to obtain the actual value 116 for the web service properties 112.

Furthermore, the annotation based assertions 105 can be converted into an expectation library 101, which is a model library that contains expectation computation logic 111. The expectation library 101 can be implemented using an object oriented programming language, e.g. JAVA programming language. Furthermore, the compliance test 102 can delegate the expectation computation task to the expectation library 101, which takes the source file 110 as an input and determine the expected value 109 for the web service properties 112.

Finally, a test developer can compare the expected value 109, computed using the expectation library 101, with the actual value 116, obtained via parsing the web service description 114, in order to determine whether the target source file 110 is compliant with the annotation based standard.

Figure 2:
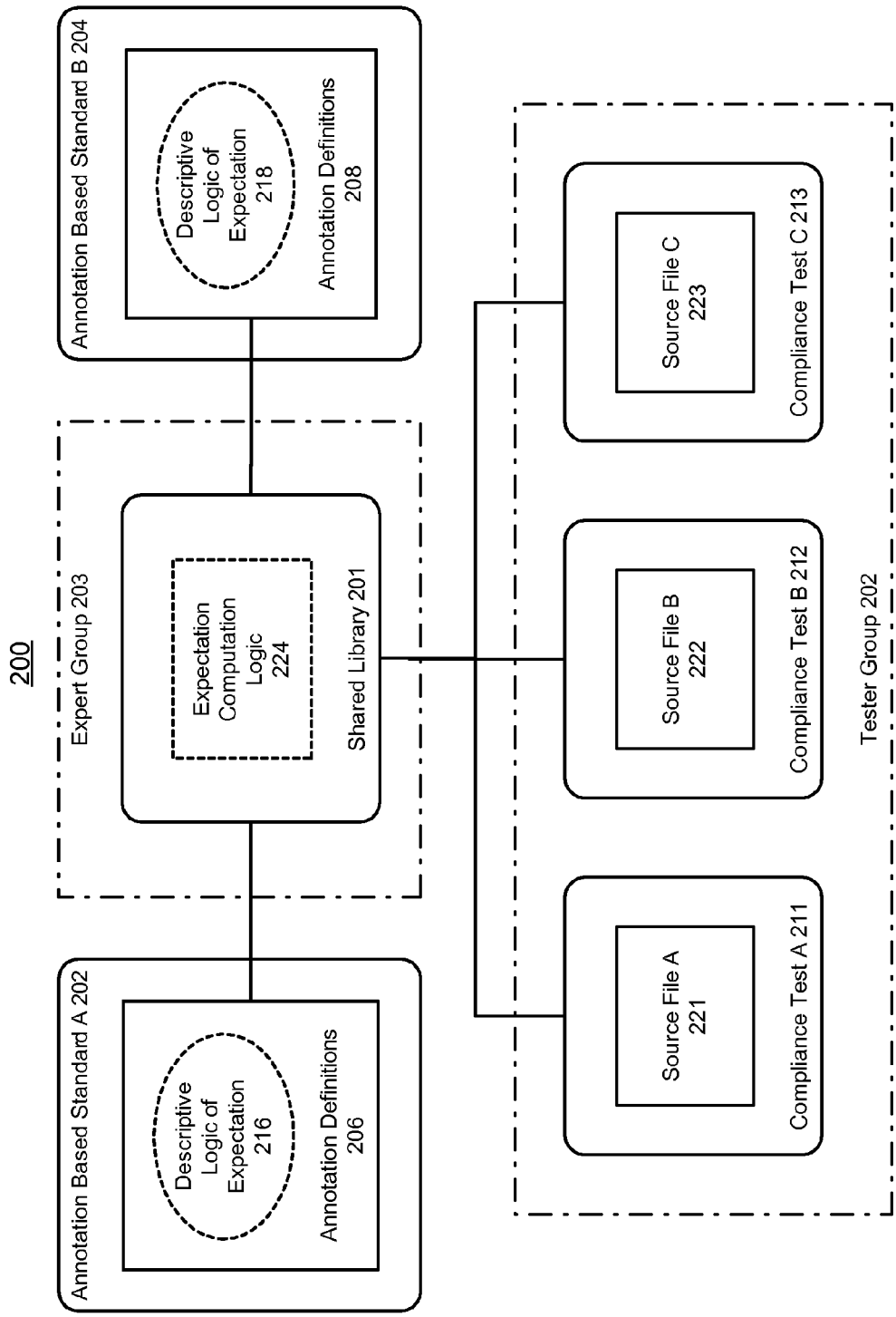
FIG. 2 shows an illustration of supporting compliance tests with annotation based standards using a shared library, in accordance with an embodiment of the invention.

FIG. 2 shows an illustration of supporting compliance tests in a testing environment 200 with annotation based standards using a shared library, in accordance with an embodiment of the invention. As shown in FIG. 2, a shared library 201 can support implementing different compliance tests 211-213 with various annotation based standards 202 and 204 in the testing environment 200. The shared library 201 can be the same as the model library 101 in terms of both internal structure and functionalities. Additionally, each compliance test 211-213 can be totally self explainable with no hard code expectation.

In accordance with an embodiment of the invention, the expectation computation logic 224 can be encapsulated in the centralized shared library 201 that are reusable by different compliance tests 211-213 for different target source files A-C 221-223.

Additionally, the centralized shared library 201 can help test developer avoid mistakes, and the centralized shared library 201 can ensure consistent understanding of different standards 202 and 204 across multiple compliance tests A-C 211-213. Furthermore, if the descriptive logic of expectation 216 or 218 for different standard 202 and 204, which is embedded in the different annotation definitions 206 and 208, changes in the future, the shared library 201 is the only place that needs to be updated in the testing environment 200.

Also as shown in FIG. 2, only an expert, or an expert group 203, needs to know the various standards 202 and 204. Test developers in a tester group 202 can be relieved from learning the tedious details in different standards 202 and 204. Therefore, the test developers can focus more on building different test scenarios instead of redundant expectation computation.

Figure 3:
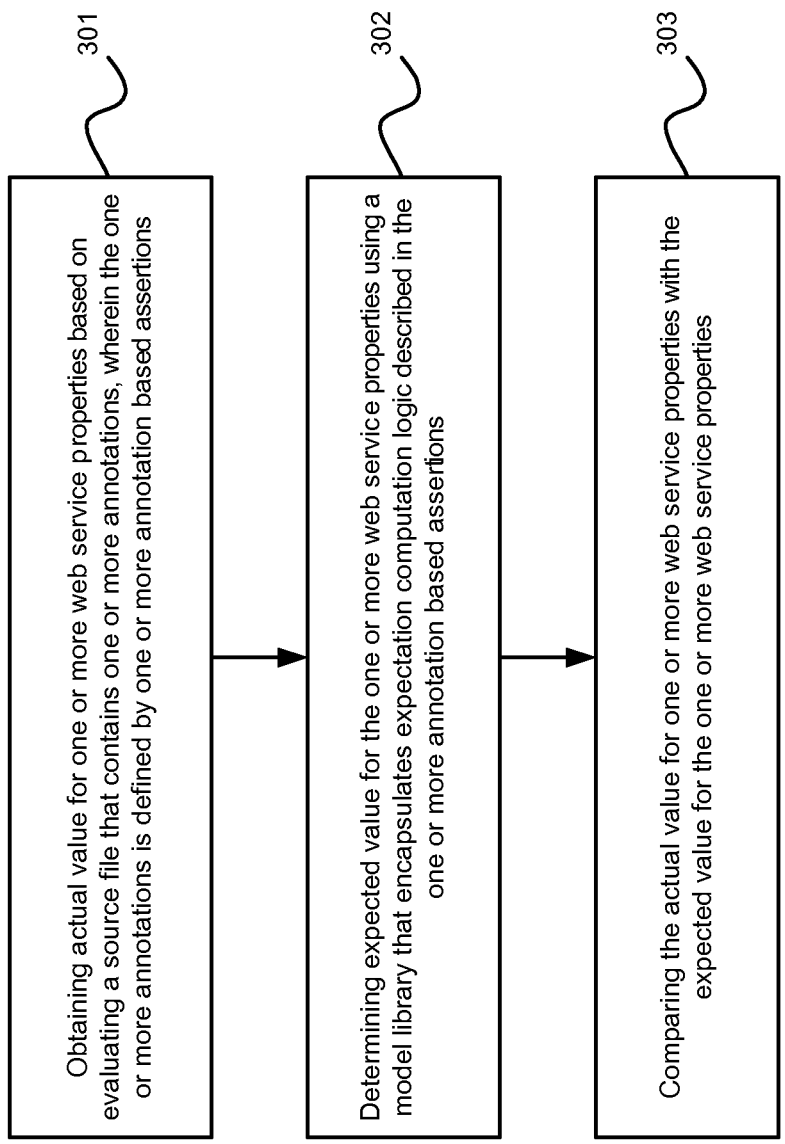
FIG. 3 illustrates an exemplary flow chart for supporting compliance tests, in accordance with an embodiment of the invention.

FIG. 3 illustrates an exemplary flow chart for supporting compliance tests, in accordance with an embodiment of the invention. As shown in FIG. 3, at step 301, a compliance test can obtain actual value for one or more web service properties based on evaluating a source file that contains one or more annotations, wherein the one or more annotations is defined by one or more annotation based assertions. Then, at step 302, the compliance test can determine expected value for the one or more web service properties using a model library that encapsulates expectation computation logic described in the one or more annotation based assertions. Finally, at step 303, the compliance test can compare the actual value for one or more web service properties with the expected value for the one or more web service properties.

A JSR 181 Compliance Test Example

The following is an exemplary compliance test for verifying whether a JAVA source file, which uses annotation javax.jws.WebService, is compliant with an annotation based standard, JSR181.

The following Listing 1 is an exemplary Java source file with optional javax.jws.WebService annotation.

Listing 1

```
/*EchoServiceImpl.java*/
package com.abc;
@WebService( name = "EchoService")
public class EchoServiceImpl {
    @WebMethod
    public String echo(String input) {
        return input;
    }
}
```

Furthermore, in the above example, JSR181 declares that a name member value can be used as the name for the wsdl:portType, and the default value for the name property associated the web service is the name of the Java class or interface where this annotation is added.

Using the programmable approach as described above, the JSR181 standard can be converted into a JSR181 library by an expert, or an expert group. The JSR181 library can encapsulate all the expectation computation logic according to JSR181. Then, the compliance test can delegate the expectation computation task to the JSR181 library using the Java source file with annotation as the input. In addition to the Java source file with javax.jws.WebService annotation, the model library can take a mapping to the WSDL file as an input, in order to compute the expected value for the wsdl:portType property, when it is mapped to a WSDL file.

Alternatively, using a manual approach, a test developer who understands the JSR181 standard can determine that the expected value for wsdl:portType is "EchoService" in this example. Then, the test developer can generate the WSDL file, e.g. using a WSDL generator provided by the application server. In the example of WebLogic Server, a compiler "jwsc" can be used to generate the WSDL file. Then, the test developer can parse the WSDL file and get the actual value for the wsdl:portType property. Finally, a compliance test can compare the expected value with the actual value to determine whether the exemplary Java source file in Listing 1 is compliant with JSR181.

In the above process, the procedure in determining the expectation value is not transparent to other test developers, who may not be experts on JSR181. Also, the compliance test has no control of the expectation computation, but relys on the assumption that the expert will not make mistake with this computation.

Additionally, another similar compliance test, based on a similar exemplary JAVA source file in the following Listing 2, may require the expected value of wsdl:portName.

Listing 2

```
/*PingServiceImpl.java*/
package com.abc;
@WebService( name = "PingService")
public class PingServiceImpl {
    @WebMethod
```

-continued

Listing 2

```
public void ping(String input) {
}
}
```

Using the manual approach, the test developer may need to perform the same expectation computation repeatedly, and need to hard code the expected value in the different tests, which can be redundant and error-prone.

Additionally, the standard can keep evolving, and the expectation computation logic may change from time to time. In the above example, it may be assumed that the assertion in the standard is changed to require that the expected value for wsdl:portName should be "EchoServiceImpl" instead of "EchoService." Using the manual approach, the test developer may need to update every place in the test where the "EchoService" is hard coded. Furthermore, different engineers may likely have different understanding of the same JSR181 standard, which prevents the QA group from implementing a consistent expectation computation for a single product.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting compliance tests on one or more microprocessors, comprising:
   obtaining an actual value for a property of a software component by parsing a description file, wherein the description file includes a plurality of properties used to configure the software component, wherein the software component is defined by a plurality of annotations in a source file, each said annotation associated with an assertion
   providing the source file as an input to a model library, wherein the model library encapsulates logic to determine expected values for assertions associated with the plurality of annotations contained in the source file;
   determining an expected value for the software component property using the model library; and
   comparing the actual value with the expected value for the software component property.

2. The method of claim 1, wherein the assertions are associated with one or more annotation based standards.

3. The method of claim 1, further comprising:
   converting one or more annotation definitions into the model library in an object oriented programming language.

4. The method of claim 1, wherein the source file is in an object oriented programming language, and is to be compiled into at least one of a software application, a software component, and a software service.

5. The method of claim 1, wherein the plurality of annotations define a web service.

6. The method of claim 5, further comprising:
   compiling the source file in order to obtain a web service description that includes the actual value for one or more web service properties.

7. The method of claim 1, wherein the model library is a shared library used by multiple compliance tests.

8. The method of claim 7, wherein each said compliance test tests a different source file.

9. The method of claim 7, further comprising:
   updating the shared library when definitions for said annotations change.

10. The method of claim 1, further comprising:
    determining whether the actual value is the same as the expected value.

11. A system for implementing compliance tests, comprising:
    one or more microprocessors;
    a model library running on the one or more microprocessors, wherein the model library encapsulates logic to determine expected values for assertions associated with a plurality of annotations contained in a source file; and
    a compliance test for verifying the source file, wherein the compliance test includes
    obtaining an actual value for a property of a software component by parsing a description file, wherein the description file includes a plurality of properties used to configure the software component, wherein the software component is defined by a plurality of annotations in the source file, each said annotation associated with an assertion,
    providing the source file as an input to a model library,
    determining an expected value for the software component property using the model library, and
    comparing the actual value with the expected Value.

12. The system of claim 11, wherein the assertions are associated with one or more annotation based standards.

13. The system of claim 11, wherein one or more annotation definitions are converted into the model library in an object oriented programming language.

14. The system of claim 11, wherein the source file is in an object oriented programming language, and is to be compiled into at least one of a software application, a software component, and a software service.

15. The system of claim 11, wherein the source file is compiled to obtain a web service description that includes the actual value for one or more web service properties.

16. The system of claim 11, wherein
the model library is a shared library used by multiple compliance tests.

17. The system of claim 16, wherein each said compliance test tests a different source file that uses the one or more annotations.

18. The system of claim 16, wherein
the shared library is updated when definitions for said annotations change.

19. The system of claim 11, wherein
the compliance test determines whether the actual value is the same as the expected value.

20. A non-transitory machine readable storage medium having instructions stored thereon that when executed cause a system to perform the steps comprising:
obtaining an actual value for a property of a software component by parsing a description file, wherein the description file includes a plurality of properties used to configure the software component, wherein the software component is defined by a plurality of annotations in a source file, each said annotation associated with an assertion;
providing the source file as an input to a model library, wherein the model library encapsulates logic to determine expected values for assertions associated with the plurality of annotations contained in the source file;
determining an expected value for the software component property using the model library; and
comparing the actual value with the expected value for the software component property.

* * * * *

UNITED STATES PATENT AND TRADEMARK OFFICE
CERTIFICATE OF CORRECTION

| | | |
|---|---|---|
| PATENT NO. | : 8,856,745 B2 | Page 1 of 1 |
| APPLICATION NO. | : 13/564590 | |
| DATED | : October 7, 2014 | |
| INVENTOR(S) | : Li | |

It is certified that error appears in the above-identified patent and that said Letters Patent is hereby corrected as shown below:

In the Specification

In column 4, line 53, delete "relys" and insert -- relies --, therefor.

In the Claims

In column 5, line 67, in Claim 1, delete "assertion" and insert -- assertion; --, therefor.

In column 6, line 55, in Claim 11, delete "Value." and insert -- value. --, therefor.

Signed and Sealed this
Fifth Day of May, 2015

Michelle K. Lee
*Director of the United States Patent and Trademark Office*